US 8,099,532 B2

(12) United States Patent
Cagno et al.

(10) Patent No.: US 8,099,532 B2
(45) Date of Patent: Jan. 17, 2012

(54) INTELLIGENT DYNAMIC MULTI-ZONE SINGLE EXPANDER CONNECTING DUAL PORTED DRIVES

(75) Inventors: Brian James Cagno, Tucson, AZ (US); John Charles Elliott, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 11/763,036

(22) Filed: Jun. 14, 2007

(65) Prior Publication Data
US 2008/0313658 A1 Dec. 18, 2008

(51) Int. Cl.
G06F 3/00 (2006.01)
G06F 5/00 (2006.01)
G06F 13/42 (2006.01)
G08B 25/00 (2006.01)

(52) U.S. Cl. .................. 710/38; 710/2; 710/42; 340/1.1; 340/16.1

(58) Field of Classification Search .................. 710/2, 38, 710/42; 340/1.1, 16.1
See application file for complete search history.

(56) References Cited

U.S. PATENT DOCUMENTS

| 6,597,956 | B1 | 7/2003 | Aziz et al. |
| 6,898,730 | B1 | 5/2005 | Hanan |
| 7,668,925 | B1 * | 2/2010 | Liao et al. ............... 709/212 |
| 2004/0088417 | A1 | 5/2004 | Bober et al. |
| 2004/0260672 | A1 * | 12/2004 | Terai et al. ............... 707/1 |
| 2005/0005062 | A1 | 1/2005 | Liu et al. |
| 2005/0102549 | A1 | 5/2005 | Davies et al. |
| 2005/0143079 | A1 | 6/2005 | Seto |
| 2006/0015537 | A1 * | 1/2006 | Marks ...................... 707/200 |
| 2006/0101171 | A1 | 5/2006 | Grieff et al. |
| 2006/0136666 | A1 | 6/2006 | Pang et al. |
| 2006/0136688 | A1 | 6/2006 | Pang et al. |
| 2006/0236028 | A1 | 10/2006 | Tanaka et al. |
| 2008/0244620 | A1 | 10/2008 | Cagno et al. |

OTHER PUBLICATIONS

U.S. Appl. No. 11/691,731, filed Mar. 27, 2007, Cagno et al.
USPTO U.S. Appl. No. 11/691,731, 2 pages.

* cited by examiner

Primary Examiner — Alford W. Kindred
Assistant Examiner — Farley Abad
(74) Attorney, Agent, or Firm — Stephen R. Tkacs; Stephen J. Walder, Jr.; Randall J. Bluestone (57) ABSTRACT

A single fibre channel switch or serial attached SCSI expander applies zoning on the initiator ports to each of the two ports of one or more drives. The fibre channel switch or serial attached SCSI expander uses zoning to connect both ports of each drive to a single expander and set the zones in the expander such that each zone includes at least one initiator port and one drive port.

18 Claims, 6 Drawing Sheets

INTELLIGENT DYNAMIC MULTI-ZONE SINGLE EXPANDER CONNECTING DUAL PORTED DRIVES

BACKGROUND

1. Technical Field

The present application relates generally to an improved data processing system and method. More specifically, the present application is directed to an intelligent dynamic multiple zone single expander connecting dual ported drives supporting dual initiator and single initiator configurations.

2. Description of Related Art

Storage area networks, or SANs, consist of multiple storage devices connected by one or more fabrics. Storage devices can be of two types: host systems that access data, and storage subsystems that are providers of data. Zoning is a network-layer access control mechanism that dictates which storage subsystems are visible to which host systems. This access control mechanism is useful in scenarios where the storage area network is shared across multiple administrative or functional domains. Such scenarios are common in large installations of storage area networks, such as those found in storage service providers.

One technology that is being used more prevalently with storage area networks is serial attached SCSI (SAS) communication protocol technology. SAS is a computer bus technology primarily designed for transfer of data to and from devices such as hard drives, CD-ROM drives, tape storage devices, and the like. SAS is a serial communication protocol for direct attached storage (DAS) devices. It is designed for the corporate and enterprise market as a replacement for parallel SCSI, allowing for much higher speed data transfers than previously available, and is backwards-compatible with serial advanced technology attachment (SATA) drives. Though SAS uses serial communication instead of the parallel method found in traditional SCSI devices, it still uses SCSI commands for interacting with SAS end devices.

Many servers are already utilizing enterprise class serially attached small computer system interface (serially attached SCSI or SAS) hard disk drives, which are dual ported. In today's non-redundant servers, the two ports of the drive are connected to a single initiator. As the architecture moves to the redundant style, it is necessary for the two ports of the SAS hard disk drives to be connected to two initiators redundantly. Both initiators see both ports on the same SAS hard disk drive (HDD). Early system adopters may need to write/rewrite much of the low level operating system code to handle such dual ported architectures, because current code cannot handle the same resource seen by two initiators.

As disk storage systems continue to increase in density, more drives in a smaller amount of space, it is also becoming increasingly complex to monitor and control all the drives in a system. With the recent adoption of SAS technology HDDs, the number of drives within a given storage domain has been dramatically increased. Theoretical fibre channel (FC) limited is 128 devices while SAS loops may contain 16,384 devices.

Typically, large systems employ a data gathering mechanism known as SCSI enclosure services (SES) to gather the status/control of the disk drives and relay that information back to the system management function. Both FC and SAS HDDs support dual ports to provide for higher availability to the data. SES usually runs separately on both loops; however, the system prefers to see a single uniform mechanism that represents both loops together. Today, this merging of loop information is performed at the lower level hardware pieces, such as on the disk drive enclosure itself with most implementations embedding the SES function within the FC switch or SAS expander. The merger of information may cause problems in the system when the information is being reported differently from each loop. Another disadvantage of this dual loop configuration is the cost of the redundant hardware when most systems may not need the hardware redundancy of the FC switch or SAS expander.

SUMMARY

The illustrative embodiments recognize the disadvantages of the prior art and apply zoning on the initiator ports of a fibre channel switch or serial attached SCSI expander to each of the two ports of one or more drives. The illustrative embodiments use zoning to connect both ports of each drive to a single expander and set the zones in the expander such that each zone includes at least one initiator port and one drive port.

In one illustrative embodiment, a computer program product comprises a computer useable medium having a computer readable program. The computer readable program, when executed in an expansion device in a storage system, causes the expansion device to zone the expansion device to connect at least one initiator to a first set of ports of the expansion device in a first zone. A first port of one or more dual ported storage devices is connected to the first set of ports of the expansion device. The computer readable program, when executed in the expansion device further causes the expansion device to zone the expansion device to connect the at least one initiator to a second set of ports of the expansion device in a second zone. A second port of the one or more dual ported storage devices is connected to the second set of ports of the expansion device.

In one exemplary embodiment, the expansion device is a fibre channel switch. In another exemplary embodiment, the expansion device is a serial attached SCSI expander.

In still another exemplary embodiment, the at least one initiator comprises a first initiator and a second initiator. Zoning the expansion device comprises zoning the expansion device to connect the first initiator to the first set of ports in the first zone and to connect the second initiator to the second set of ports in the second zone.

In a further exemplary embodiment, the at least one initiator comprises a first initiator and a second initiator. The first initiator is connected to a first wide port of the expansion device. The second initiator is connected to a second wide port of the expansion device. Zoning the expansion device comprises zoning a first portion of the first wide port and a first portion of the second wide port to connect to the first set of ports in the first zone and zoning a second portion of the first wide port and a second portion of the second wide port to connect to the second set of ports in the second zone.

In another illustrative embodiment, a storage system comprises an expansion device that is configured to be coupled to at least one initiator and one or more dual ported storage devices. A first port of the one or more dual ported storage devices is connected to a first set of ports of the expansion device. A second port of the one or more dual ported storage devices is connected to a second set of ports of the expansion device. The expansion device is zoned to connect the at least one initiator to the first set of ports in a first zone and to connect the at least one initiator to the second set of ports in a second zone.

In one exemplary embodiment, the expansion device is a fibre channel switch. In another exemplary embodiment, the expansion device is a serial attached SCSI expander.

In a further exemplary embodiment, the at least one initiator comprises a first initiator and a second initiator. The expansion device is zoned to connect the first initiator to the first set of ports in a first zone and to connect the second initiator to the second set of ports in a second zone.

In another exemplary embodiment, the storage system further comprises a storage enclosure. The storage enclosure comprises the expansion device and the one or more dual ported storage devices. In a further exemplary embodiment, the expansion device is a first expansion device, and the at least one initiator comprises a first initiator and a second initiator. The storage system further comprises a second expansion device. The first initiator is connected to a first port of the second expansion device. The second initiator is connected to a second port of the second expansion device. The first expansion device is connected to at least a third port of the second expansion device. In a still further exemplary embodiment, the second expansion device is zoned to connect the first port of the second expansion device to the at least a third port of the second expansion device and to connect the second port of the second expansion device to the at least a third port of the second expansion device.

In a further illustrative embodiment, a method for configuring a storage system comprises providing in the storage system a expansion device that is configured to be coupled to at least one initiator and one or more dual ported storage devices, connecting a first port of the one or more dual ported storage devices to a first set of ports of the expansion device, connecting a second port of the one or more dual ported storage devices to a second set of ports of the expansion device, and zoning the expansion device to connect the at least one initiator to the first set of ports in a first zone and to connect the at least one initiator to the second set of ports in a second zone.

In one exemplary embodiment, the expansion device is a fibre channel switch. In another exemplary embodiment, the expansion device is a serial attached SCSI expander.

In another exemplary embodiment, the at least one initiator comprises a first initiator and a second initiator. Zoning the expansion device comprises zoning the expansion device to connect the first initiator to the first set of ports in a first zone and to connect the second initiator to the second set of ports in a second zone.

In a further exemplary embodiment, the at least one initiator comprises a first initiator and a second initiator. The method comprises connecting the first initiator to a first wide port of the expansion device and connecting the second initiator to a second wide port of the expansion device. Zoning the expansion device comprises zoning a first portion of the first wide port and a first portion of the second wide port to connect to the first set of ports in the first zone and zoning a second portion of the first wide port and a second portion of the second wide port to connect to the second set of ports in the second zone.

In one exemplary embodiment, the expansion device and the one or more dual ported storage devices are provided in a storage enclosure. In a further exemplary embodiment, the expansion device is a first expansion device. The at least one initiator comprises a first initiator and a second initiator. The method further comprises connecting the first initiator to a first port of a second expansion device, connecting the second initiator to a second port of the second expansion device, and connecting the first expansion device to at least a third port of the second expansion device. In a still further exemplary embodiment, the method further comprises zoning the second expansion device to connect the first port of the second expansion device to the at least a third port of the second expansion device and to connect the second port of the second expansion device to the at least a third port of the second expansion device.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

With reference now to the figures and in particular with reference to FIGS. 1-6, exemplary diagrams of data processing environments are provided in which illustrative embodiments of the present invention may be implemented. It should be appreciated that FIGS. 1-6 are only exemplary and are not intended to assert or imply any limitation with regard to the environments in which aspects or embodiments of the present invention may be implemented. Many modifications to the depicted environments may be made without departing from the spirit and scope of the present invention.

Figure 1:
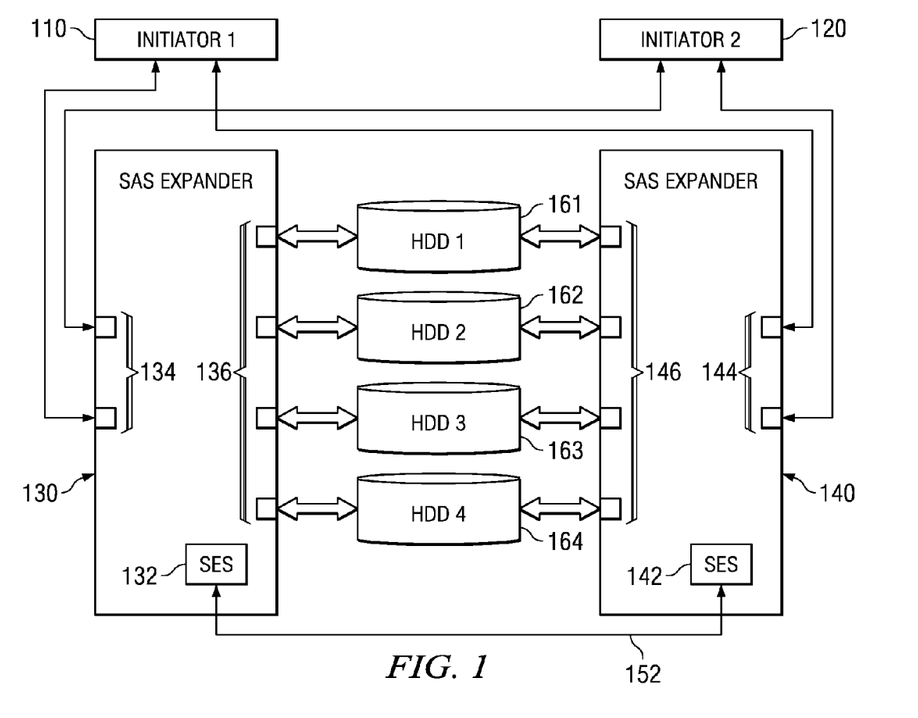
FIG. 1 is a block diagram illustrating a storage system with two serially attached SCSI expanders and dual ported drives in accordance with an illustrative embodiment.

With reference now to the figures, FIG. 1 is a block diagram illustrating a storage system with two serially attached SCSI expanders and dual ported drives in accordance with an illustrative embodiment. Initiator 1 110 and initiator 2 120 are connected to SAS expander 130 through ports 134 and SAS expander 140 through ports 144. SAS expander 130 is connected to dual ported hard disk drives (HDDs) 161-164 through ports 136. SAS expander 140 is connected to dual ported hard disk drives (HDDs) 161-164 through ports 146. Each initiator has a connection to each port of HDDs 161-164 through SAS expanders 130, 140.

SAS expander 130 includes an on-chip SCSI enclosure services (SES) processor 132, which is used to create and manage zoning. Similarly, SAS expander 140 includes SES processor 142. One example of a family of expander products is the NexSAS™ family of products from Vitesse Semiconductor. Alternatively, a SCSI management protocol (SMP) function, which may run on initiators 110, 120 could also be involved in zoning. In the depicted example, SES processors 132, 142 are connected together using bus 152 for communication. Bus 152 may be, for example, an inter-integrated circuit (IIC or I2C) bus.

FIG. 1 represents a dual initiator SAS configuration. Each initiator 110, 120 has a connection to each port of the HDDs 161-164 through SAS expander 130 or SAS expander 140. Operating system and functional code in initiators 110, 120 may be limited in that they cannot see both ports of HDDs 161-164 at the same time. Therefore, the storage system must be zoned such that each initiator sees drives through only one port. SES processor 132 and SES processor 142 may determine the default zoning configuration.

The storage system may be, for example, a rack system such as the IBM DS8000™ rack system, which may include multiple components coupled by a rack/system bus, or a storage area network (SAN), which may comprise multiple storage systems, such as multiple physically separate DS8000™ rack systems and other storage systems coupled by a network. Thus, the illustrative embodiments described herein may be implemented in a storage system that may include a rack system, a plurality of rack systems, or a storage area network comprising a plurality of rack systems connected by a network. SAS expanders 130 and 140 are examples of expansion devices. An expansion device may be a SAS expander, as in FIG. 1, or may be a fibre channel switch, a hub, or the like. The illustrative embodiments described herein may apply to any expansion device in a storage system. Further modifications may be made to the arrangement and configuration of devices within the spirit and scope of the present invention.

Figure 2:
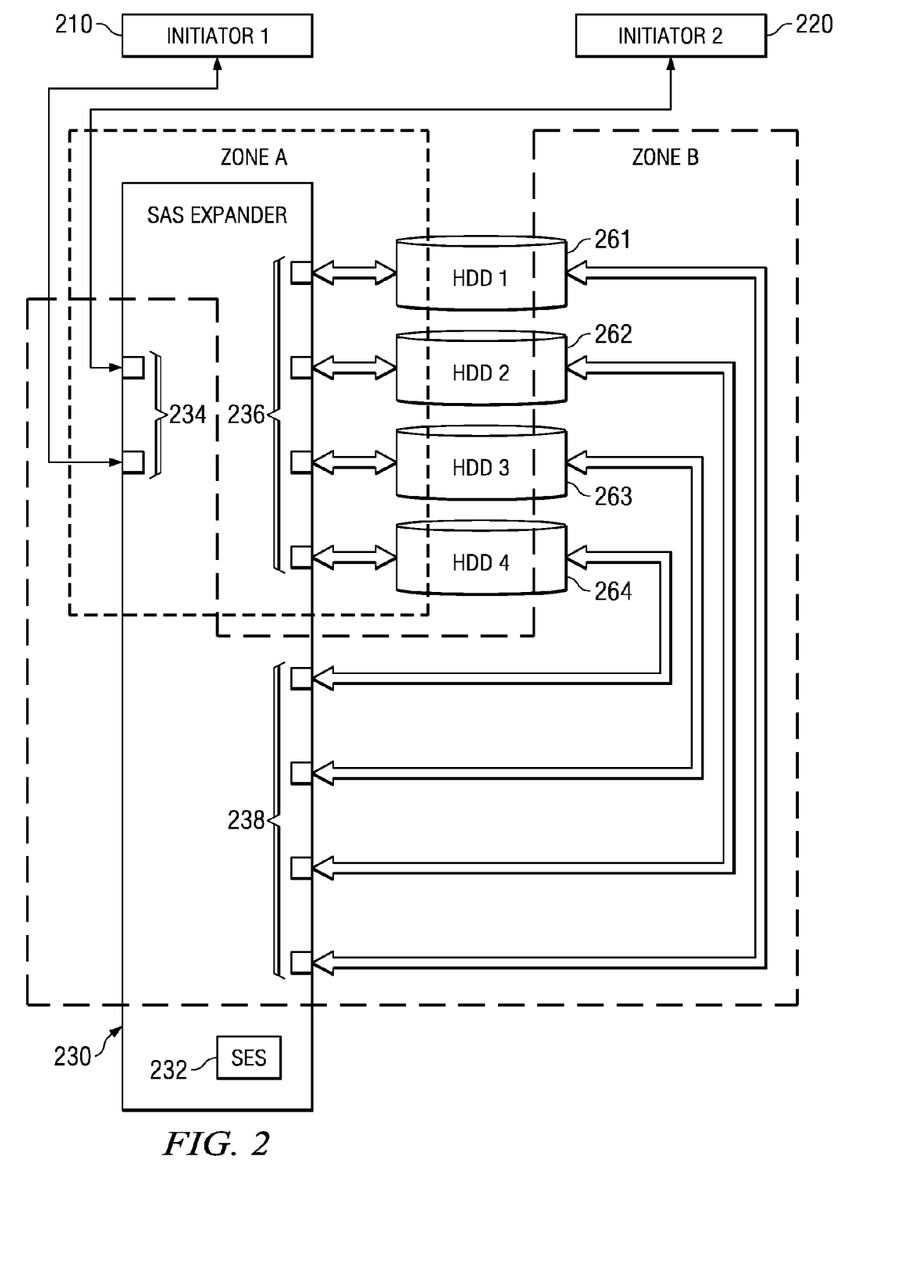
FIG. 2 illustrates an intelligent dynamic multiple zone single expander connecting dual ported drives supporting a dual initiator configuration in accordance with an illustrative embodiment.

FIG. 2 illustrates an intelligent dynamic multiple zone single expander connecting dual ported drives supporting a dual initiator configuration in accordance with an illustrative embodiment. Initiator 1 210 and initiator 2 220 are connected to SAS expander 230 through ports 234. SAS expander 230 is connected to dual ported hard disk drives (HDDs) 261-264 through ports 236 and ports 238. Each initiator has a connection to each port of HDDs 261-264 through SAS expander 230.

SAS expander 230 includes an on-chip SCSI enclosure services (SES) processor 232, which is used to create and manage zoning. One example of a family of expander products is the NexSAS™ family of products from Vitesse Semiconductor. Alternatively, a SCSI management protocol (SMP) function, which may run on initiators 210, 220 could also be involved in zoning.

FIG. 2 represents a dual initiator SAS configuration with a single SAS expander. Each initiator 210, 220 has a connection to each port of the HDDs 261-264 through expander 230. Operating system and functional code in initiators 210, 220 may be limited in that they cannot see both ports of HDDs 261-264 at the same time. Therefore, the SAN must be zoned such that each initiator sees drives through only one port. SES processor 232 may determine the default zoning configuration.

In the depicted example, SES processor 232 configures zone A to connect ports 234 with ports 236 so that initiator 1 210 and initiator 2 220 see HDDs 261-264 through ports 236. SES processor 232 also configures zone B to connect ports 234 with ports 238 so that initiator 1 210 and initiator 2 220 see HDDs 261-264 through ports 238. This configuration reduces the cost relative to that of FIG. 1 by decreasing the number of SAS expanders from two to one. This configuration simplifies the wiring of the system by eliminating the second set of high speed cables from initiators to expanders. The configuration may use a low cost and simple signal routing card or special single expander backplane to connect the dual port HDDs to the single expander. The configuration shown in FIG. 2 also simplifies the management of SES information because there is only one entity to manage the enclosure. Thus, there is no merger of information required.

Figure 3:
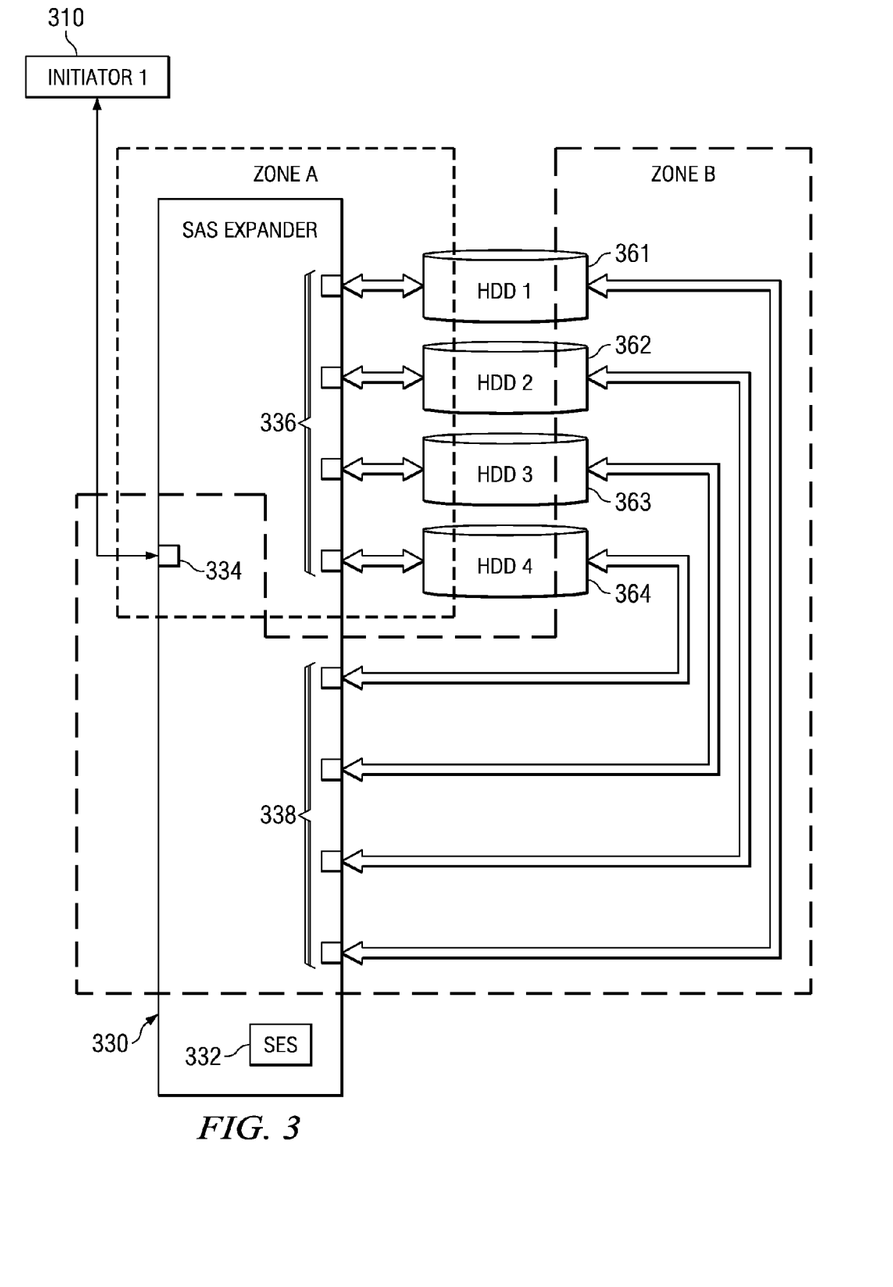
FIG. 3 illustrates an intelligent dynamic multiple zone single expander connecting dual ported drives supporting a single initiator configuration in accordance with an illustrative embodiment.

FIG. 3 illustrates an intelligent dynamic multiple zone single expander connecting dual ported drives supporting a single initiator configuration in accordance with an illustrative embodiment. Initiator 1 310 is connected to SAS expander 330 through port 334. SAS expander 330 is connected to dual ported hard disk drives (HDDs) 361-364 through ports 336 and ports 338. The initiator has a connection to each port of HDDs 361-364 through SAS expander 330.

SAS expander 330 includes an on-chip SCSI enclosure services (SES) processor 332, which is used to create and manage zoning. One example of a family of expander products is the NexSAS™ family of products from Vitesse Semiconductor. Alternatively, a SCSI management protocol (SMP) function, which may run on initiator 1 310 could also be involved in zoning.

FIG. 3 represents a single initiator SAS configuration with a single SAS expander. Initiator 1 310 has a connection to each port of the HDDs 361-364 through SAS expander 330. Operating system and functional code in initiator 1 310 may be limited in that they cannot see both ports of HDDs 361-364 at the same time. Therefore, the SAN must be zoned such that each initiator sees drives through only one port. SES processor 332 may determine the default zoning configuration.

In the depicted example, SES processor 332 configures zone A to connect port 334 with ports 336 so that initiator 1 310 sees HDDs 361-364 through ports 336. SES processor 332 also configures zone B to connect port 334 with ports 338 so that initiator 1 310 sees HDDs 361-364 through ports 338. This configuration reduces the cost relative to that of FIG. 1 by decreasing the number of SAS expanders from two to one. The redundancy of the second SAS expander does not make much sense with a single initiator. This configuration simplifies the wiring of the system by eliminating the second set of high speed cables from initiators to expanders. The configuration shown in FIG. 3 also simplifies the management of SES information because there is only one entity to manage the enclosure. Thus, there is no merger of information required.

Figure 4:
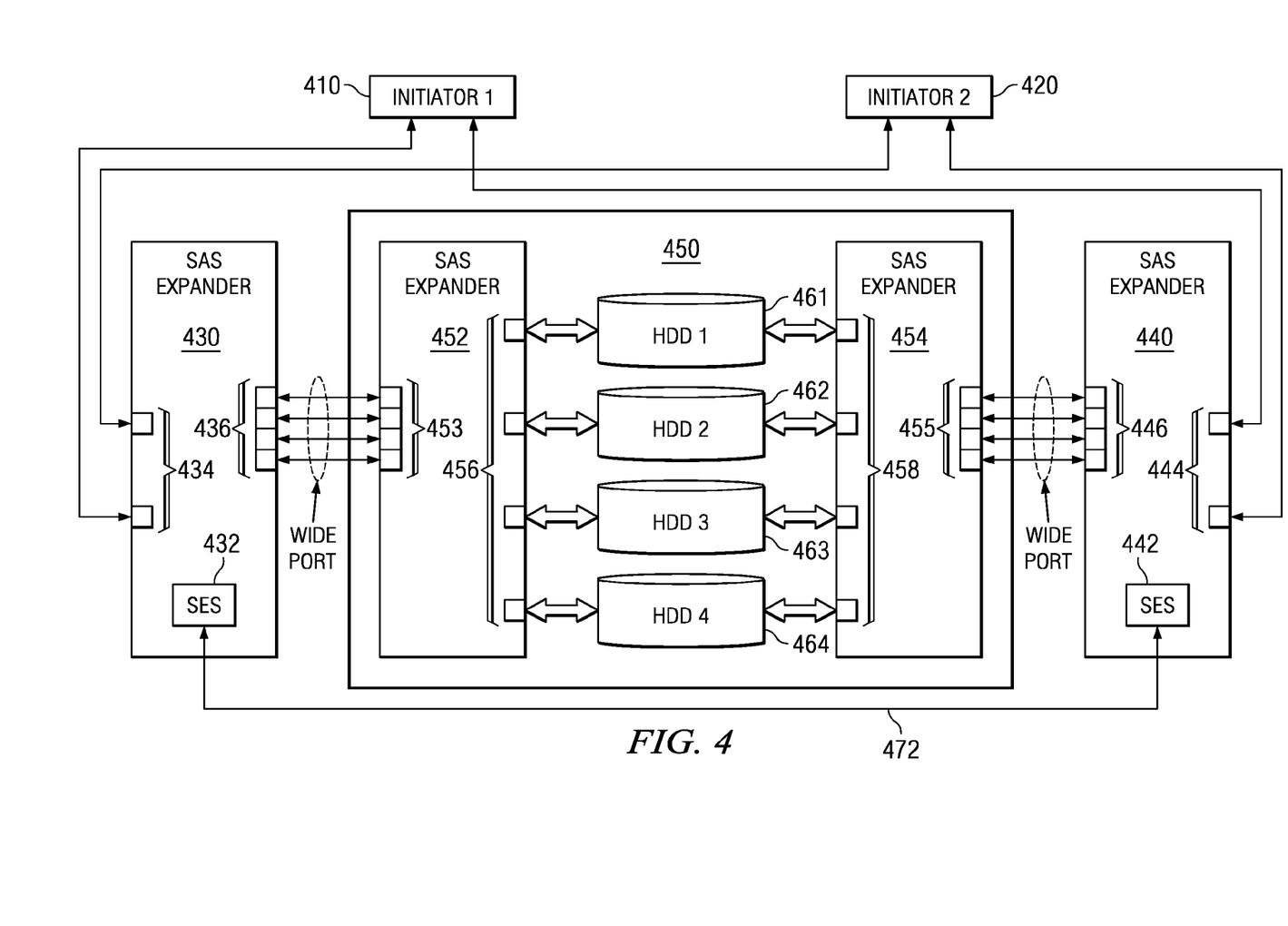
FIG. 4 is a block diagram illustrating a wide port topology with serially attached SCSI expanders and dual ported drives in accordance with an illustrative embodiment.

FIG. 4 is a block diagram illustrating a wide port topology with serially attached SCSI expanders and dual ported drives in accordance with an illustrative embodiment. Initiator 1 410 and initiator 2 420 are connected to SAS expander 430 through ports 434 and SAS expander 440 through ports 444. Ports 436 of SAS expander 430 are connected to ports 453 of SAS expander 452 in storage enclosure 450 through wide port busses. Similarly, ports 446 of SAS expander 440 are connected to ports 455 of SAS expander 454 in storage enclosure 450 through wide port busses.

Within storage enclosure 450, SAS expander 452 is connected to dual ported hard disk drives (HDDs) 461-464 through ports 456. SAS expander 454 is connected to dual ported hard disk drives (HDDs) 461-464 through ports 458. Each initiator has a connection to each port of HDDs 461-464 through SAS expanders 430, 440, 452, and 454.

SAS expander 430 includes an on-chip SCSI enclosure services (SES) processor 432, which is used to create and manage zoning. Similarly, SAS expander 440 includes SES processor 442. SAS expanders 452 and 454 may also include SES processors (not shown for simplicity) and be connected by a communication bus (not shown for simplicity). One example of a family of expander products is the NexSAS™ family of products from Vitesse Semiconductor. Alternatively, a SCSI management protocol (SMP) function, which may run on initiators 410, 420 could also be involved in zoning. In the depicted example, SES processors 432, 442 are connected together using bus 472 for communication. Bus 472 may be, for example, an inter-integrated circuit (IIC or I2C) bus.

FIG. 4 represents a dual initiator SAS configuration. Each initiator 410, 420 has a connection to each port of the HDDs 461-464 through SAS expander 430 or SAS expander 440. Operating system and functional code in initiators 410, 420 may be limited in that they cannot see both ports of HDDs 461-464 at the same time. Therefore, the SAN must be zoned such that each initiator sees drives through only one port. SES processor 432 and SES processor 442, as well as SES processors in SAS expanders 452 and 454, may determine the default zoning configuration.

Figure 5:
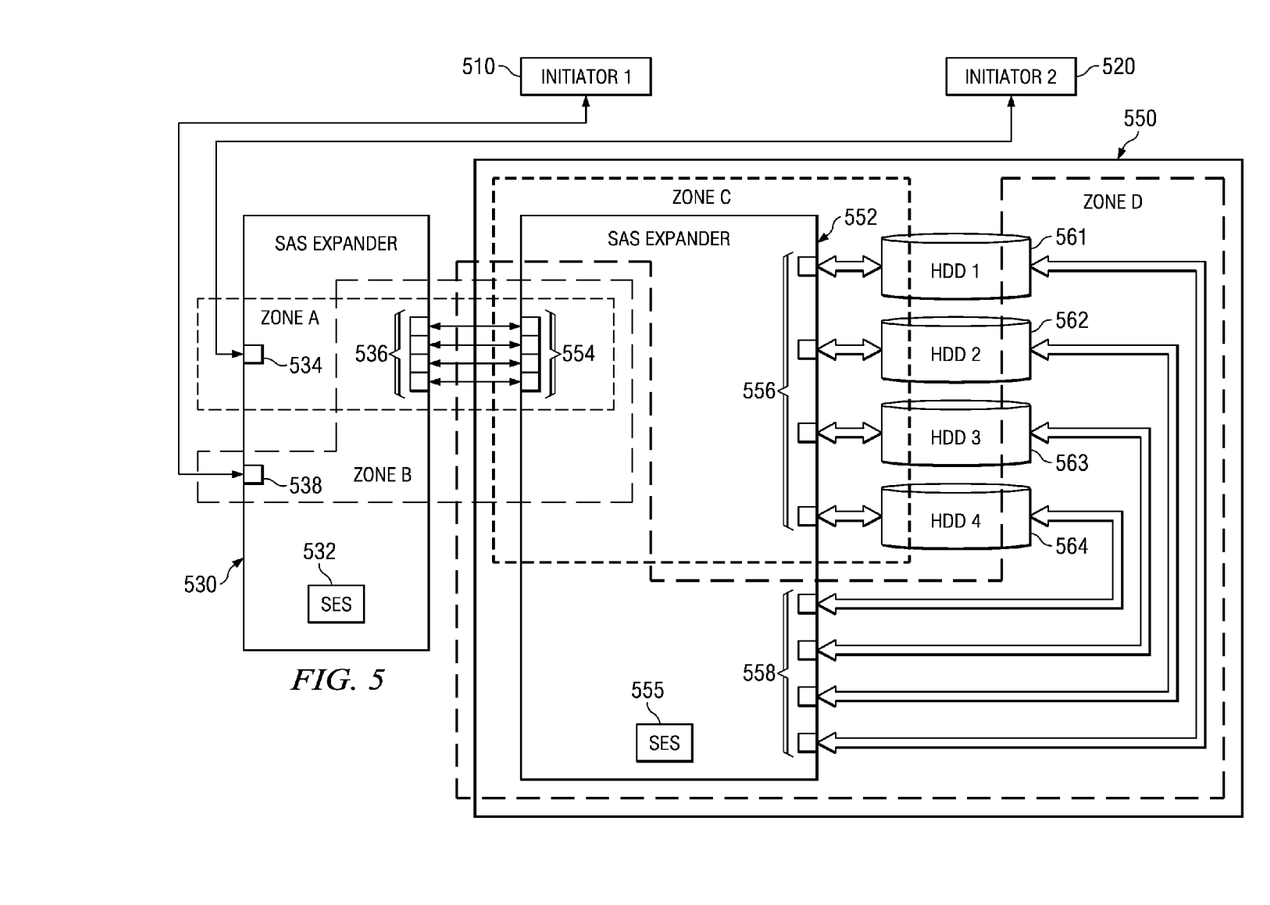
FIG. 5 illustrates an intelligent dynamic multiple zone single expander configuration connecting dual ported drives supporting a dual initiator configuration in accordance with an illustrative embodiment.

FIG. 5 illustrates an intelligent dynamic multiple zone single expander configuration connecting dual ported drives supporting a dual initiator configuration in accordance with an illustrative embodiment. Initiator 1 510 and initiator 2 520 are connected to SAS expander 530 through ports 534 and 538. Ports 536 of SAS expander 530 are connected to ports 554 of SAS expander 552 in storage enclosure 550 through wide port busses.

Within storage enclosure 550, SAS expander 552 is connected to dual ported hard disk drives (HDDs) 561-564 through ports 556 and ports 558. Each initiator has a connection to each port of HDDs 561-564 through SAS expander 530 and SAS expander 552.

SAS expander 530 includes an on-chip SCSI enclosure services (SES) processor 532, which is used to create and manage zoning. SAS expander 552 includes SES processor 555. One example of a family of expander products is the NexSAS™ family of products from Vitesse Semiconductor. Alternatively, a SCSI management protocol (SMP) function, which may run on initiators 510, 520 could also be involved in zoning.

FIG. 5 represents a dual initiator SAS configuration. Each initiator 510, 520 has a connection to each port of the HDDs 561-564 through SAS expander 530 and SAS expander 552. Operating system and functional code in initiators 510, 520 may be limited in that they cannot see both ports of HDDs 561-564 at the same time. Therefore, the SAN must be zoned such that each initiator sees drives through only one port. SES processor 532 and SES processor 555 may determine the default zoning configuration.

In the depicted example, SES processor 532 configures zone A to connect port 534 with ports 536 so that initiator 2 520 sees storage enclosure 550 through ports 536. SES processor 532 also configures zone B to connect port 538 with ports 536 so that initiator 1 510 sees storage enclosure 550 through ports 536.

Within storage enclosure 550, SES processor 555 configures zone C to connect ports 554 with ports 556 so that initiator 1 510 and initiator 2 520 see HDDs 561-564 through ports 556. SES processor 555 also configures zone D to connect ports 554 with ports 558 so that initiator 1 510 and initiator 2 520 see HDDs 561-564 through ports 558. This configuration reduces the cost relative to that of FIG. 4 by decreasing the number of SAS expanders from four to two. This configuration simplifies the wiring of the system by eliminating the second set of high speed cables from initiators to expanders and from expanders to expanders. The configuration shown in FIG. 5 also simplifies the management of SES information because there is no merger of information required.

Figure 6:
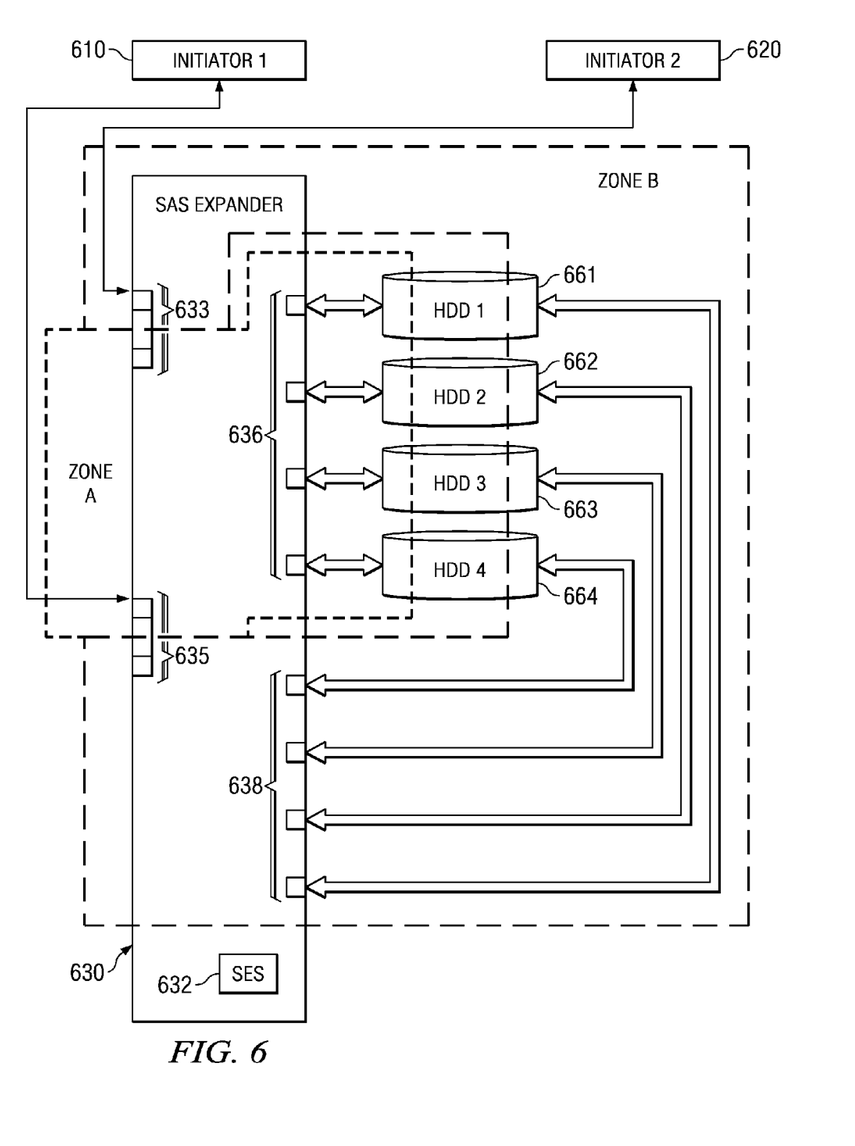
FIG. 6 illustrates an intelligent dynamic multiple zone single expander connecting dual ported drives supporting a dual initiator wide port configuration in accordance with an illustrative embodiment.

FIG. 6 illustrates an intelligent dynamic multiple zone single expander connecting dual ported drives supporting a dual initiator wide port configuration in accordance with an illustrative embodiment. Initiator 1 610 and initiator 2 620 are connected to SAS expander 630 through wide ports 633 and 635. SAS expander 630 is connected to dual ported hard disk drives (HDDs) 661-664 through ports 636 and ports 638. Each initiator has a connection to each port of HDDs 661-664 through SAS expander 630.

SAS expander 630 includes an on-chip SCSI enclosure services (SES) processor 632, which is used to create and manage zoning. One example of a family of expander products is the NexSAS™ family of products from Vitesse Semiconductor. Alternatively, a SCSI management protocol (SMP) function, which may run on initiators 610, 620 could also be involved in zoning.

FIG. 6 represents a dual initiator wide port SAS configuration with a single SAS expander. Each initiator 610, 620 has a connection to each port of the HDDs 661-664 through expander 630. Operating system and functional code in initiators 610, 620 may be limited in that they cannot see both ports of HDDs 661-664 at the same time. Therefore, the SAN must be zoned such that each initiator sees drives through only one port. SES processor 632 may determine the default zoning configuration.

In the depicted example, SES processor 632 configures zone A to connect half of wide port 633 and half of wide port 635 with ports 636 so that initiator 1 610 and initiator 2 620 see HDDs 661-664 through ports 636. SES processor 632 also configures zone B to connect the other half of wide ports 633 and 635 with ports 638 so that initiator 1 610 and initiator 2 620 see HDDs 661-664 through ports 638. This configuration reduces the cost relative to that of FIG. 1 by decreasing the number of SAS expanders from two to one. This configuration simplifies the wiring of the system by eliminating the second set of high speed cables from initiators to expanders. The configuration shown in FIG. 6 also simplifies the management of SES information because there is only one entity to manage the enclosure. Thus, there is no merger of information required.

Figure 7:
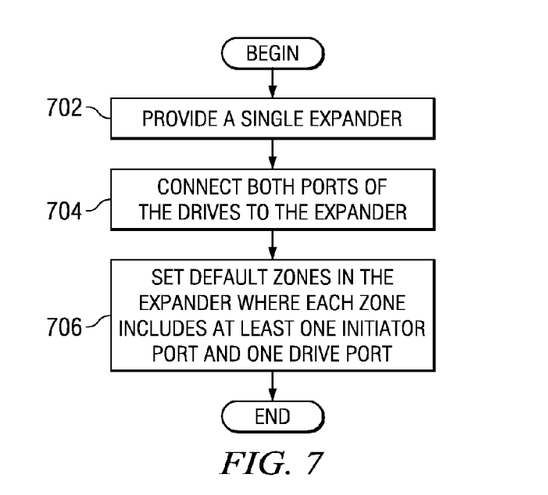
FIG. 7 is a flowchart illustrating operation of configuring a storage system with intelligent dynamic multiple zone single expander connecting dual ported drives in accordance with an illustrative embodiment.

FIG. 7 is a flowchart illustrating operation of configuring a storage system with intelligent dynamic multiple zone single expander connecting dual ported drives in accordance with an illustrative embodiment. Operation begins and an administrator provides a single expander (block 702). A single expander may be provided within a server, within a layer of a storage area network, within a storage enclosure, or a combination thereof. That is, anywhere two or more expanders may be provided for redundancy and to provide separate loops for communication with dual ported drives, a single expander is provided.

Also note that in FIGS. 1-7, SAS expanders are shown by example. The illustrative embodiments are applicable with any communication device within a storage area network that is used to connect initiators to drives. For example, the configurations of FIGS. 1-7 may be modified to include fibre channel (FC) switches in place of SAS expanders. Other modifications may be made to the illustrative embodiments within the spirit and scope of the present invention.

Next, the administrator connects both ports of the drives to the expander (block 704). The SES processor in the SAS expander sets the default zones in the expander such that each zone includes at least one initiator and one drive port (block 706). Thereafter, operation ends.

Thus, the illustrative embodiments solve the disadvantages of the prior art by applying zoning on the initiator ports of a switch or expander to each of the two ports of one or more drives. The illustrative embodiments use zoning to connect both ports of each drive to a single expander and set the zones in the expander such that each zone includes at least one initiator port and one drive port.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read-only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer storage medium having a computer readable program, wherein the computer readable program, when executed in an expansion device in a storage system, causes the expansion device to:
   zone the expansion device to connect at least one initiator to a first set of ports of the expansion device in a first zone, wherein a first port of each of one or more dual ported storage devices is connected to the first set of ports of the expansion device;
   zone the expansion device to connect the at least one initiator to a second set of ports of the expansion device in a second zone, wherein a second port of each of the one or more dual ported storage devices is connected to the second set of ports of the expansion device;
   wherein the at least one initiator comprises a first initiator and a second initiator, wherein the first initiator is connected to a first wide port of the expansion device, wherein the second initiator is connected to a second wide port of the expansion device, and wherein zoning the expansion device comprises:
   zoning a first portion of the first wide port and a first portion of the second wide port to connect to the first set of ports in the first zone; and
   zoning a second portion of the first wide port and a second portion of the second wide port to connect to the second set of ports in the second zone.

2. The computer program product of claim 1, wherein the expansion device is a fibre channel switch.

3. The computer program product of claim 1, wherein the expansion device is a serial attached SCSI expander.

4. The computer program product of claim 1, wherein the at least one initiator comprises a first initiator and a second initiator and wherein zoning the expansion device comprises:
   zoning the expansion device to connect the first initiator to the first set of ports in the first zone and to connect the second initiator to the second set of ports in the second zone.

5. A storage system, comprising:
   an expansion device that is configured to be coupled to at least one initiator and one or more dual ported storage devices,
   wherein a first port of each of the one or more dual ported storage devices is connected to a first set of ports of the expansion device;
   wherein a second port of each of the one or more dual ported storage devices is connected to a second set of ports of the expansion device;
   wherein the expansion device is zoned to connect the at least one initiator to the first set of ports in a first zone and to connect the at least one initiator to the second set of ports in a second zone;
   wherein the at least one initiator comprises a first initiator and a second initiator, wherein the first initiator is connected to a first wide port of the expansion device, wherein the second initiator is connected to a second wide port of the expansion device, and wherein the zoned expansion device comprises:
   zoning a first portion of the first wide port and a first portion of the second wide port to connect to the first set of ports in the first zone; and
   zoning a second portion of the first wide port and a second portion of the second wide port to connect to the second set of ports in the second zone.

6. The storage system of claim 5, wherein the expansion device is a fibre channel switch.

7. The storage system of claim 5, wherein the expansion device is a serial attached SCSI expander.

8. The storage system of claim 5, wherein the at least one initiator comprises a first initiator and a second initiator, and wherein the expansion device is zoned to connect the first initiator to the first set of ports in a first zone and to connect the second initiator to the second set of ports in a second zone.

9. The storage system of claim 5, further comprising:
a storage enclosure, wherein the storage enclosure comprises the expansion device and the one or more dual ported storage devices.

10. The storage system of claim 9, wherein the expansion device is a first expansion device and wherein the at least one initiator comprises a first initiator and a second initiator, the storage system further comprising:
a second expansion device, wherein the first initiator is connected to a first port of the second expansion device, wherein the second initiator is connected to a second port of the second expansion device, and wherein the first expansion device is connected to at least a third port of the second expansion device.

11. The storage system of claim 10, wherein the second expansion device is zoned to connect the first port of the second expansion device to the at least a third port of the second expansion device and to connect the second port of the second expansion device to the at least a third port of the second expansion device.

12. A method for configuring a storage system, the method comprising:
providing in the storage system an expansion device that is configured to be coupled to at least one initiator and one or more dual ported storage devices;
connecting a first port of each of the one or more dual ported storage devices to a first set of ports of the expansion device;
connecting a second port of each of the one or more dual ported storage devices to a second set of ports of the expansion device;
zoning the expansion device to connect the at least one initiator to the first set of ports in a first zone and to connect the at least one initiator to the second set of ports in a second zone;
wherein the at least one initiator comprises a first initiator and a second initiator, the method comprising:
connecting the first initiator to a first wide port of the expansion device; and connecting the second initiator to a second wide port of the expansion device, wherein zoning the expansion device comprises:
zoning a first portion of the first wide port and a first portion of the second wide port to connect to the first set of ports in the first zone; and
zoning a second portion of the first wide port and a second portion of the second wide port to connect to the second set of ports in the second zone.

13. The method of claim 12, wherein the expansion device is a fibre channel switch.

14. The method of claim 12, wherein the expansion device is a serial attached SCSI expander.

15. The method of claim 12, wherein the at least one initiator comprises a first initiator and a second initiator and wherein zoning the expansion device comprises:
zoning the expansion device to connect the first initiator to the first set of ports in a first zone and to connect the second initiator to the second set of ports in a second zone.

16. The method of claim 12, wherein the expansion device and the one or more dual ported storage devices are provided in a storage enclosure.

17. The method of claim 16, wherein the expansion device is a first expansion device and wherein the at least one initiator comprises a first initiator and a second initiator, the method further comprising:
connecting the first initiator to a first port of a second expansion device;
connecting the second initiator to a second port of the second expansion device; and
connecting the first expansion device to at least a third port of the second expansion device.

18. The method of claim 17, further comprising:
zoning the second expansion device to connect the first port of the second expansion device to the at least a third port of the second expansion device and to connect the second port of the second expansion device to the at least a third port of the second expansion device.

* * * * *